United States Patent [19]

Riley

[11] Patent Number: 5,538,590
[45] Date of Patent: Jul. 23, 1996

[54] SEALING ELEMENT FOR PACKAGING MACHINES

[75] Inventor: David C. Riley, Kingston, Canada

[73] Assignee: DuPont Canada Inc., Mississauga, Canada

[21] Appl. No.: 402,781

[22] Filed: Mar. 13, 1995

Related U.S. Application Data

[63] Continuation-in-part of Ser. No. 104,099, filed as PCT/CA92/00054, Feb. 7, 1992, abandoned.

[30] Foreign Application Priority Data

Feb. 26, 1991 [GB] United Kingdom ............... 9103953

[51] Int. Cl.⁶ .................................................. B30B 15/34
[52] U.S. Cl. ............................ 156/583.2; 156/583.4; 219/243; 100/93 P
[58] Field of Search ................ 156/583.1, 583.2, 156/583.4, 583.6, 583.7, 583.8, 583.9, 580, 581; 219/243; 100/93 P

[56] References Cited

U.S. PATENT DOCUMENTS

| | | | |
|---|---|---|---|
| 2,904,100 | 9/1959 | Fener | 154/42 |
| 3,409,494 | 11/1968 | Korzinck | 156/515 |
| 3,547,884 | 12/1970 | Moller | 260/47 |
| 3,948,720 | 4/1976 | Reil | 156/583.4 X |
| 4,390,384 | 1/1983 | Turner | 156/583.2 X |
| 4,981,546 | 1/1991 | Bergevin | 156/583.2 |
| 5,149,943 | 10/1992 | Kupcikevicius et al. | 219/243 |
| 5,158,132 | 10/1992 | Guillemot | 165/30 |

FOREIGN PATENT DOCUMENTS

| | | |
|---|---|---|
| 2099589 | 3/1972 | France . |
| 1256577 | 12/1967 | Germany . |
| 8529054 | 1/1986 | Germany . |
| 658258 | 10/1951 | United Kingdom . |
| 8707212 | 12/1987 | WIPO . |

Primary Examiner—David A. Simmons
Assistant Examiner—J. Sells

[57] ABSTRACT

An assembly for heat sealing thermoplastic film, having a first jaw (11) and (optionally) a second jaw (not shown), an electrical impulse heat sealing element (12) mounted on the first jaw (11), electrical terminals (17) connected to the element (12), and at least one electrically and thermally insulating film or tape (14) between the first jaw (11) and the heat sealing element (12). At least one of the jaws is capable of transverse motion and is adapted to collapse a tubular film made from the thermoplastic film and passing between the jaws. The improved heat sealing assembly has a first jaw (11) which has a thermally insulating material (16) embedded therein along a length about equal to the width of the flattened film and having a width at least as great as the width of the sealing element.

10 Claims, 1 Drawing Sheet

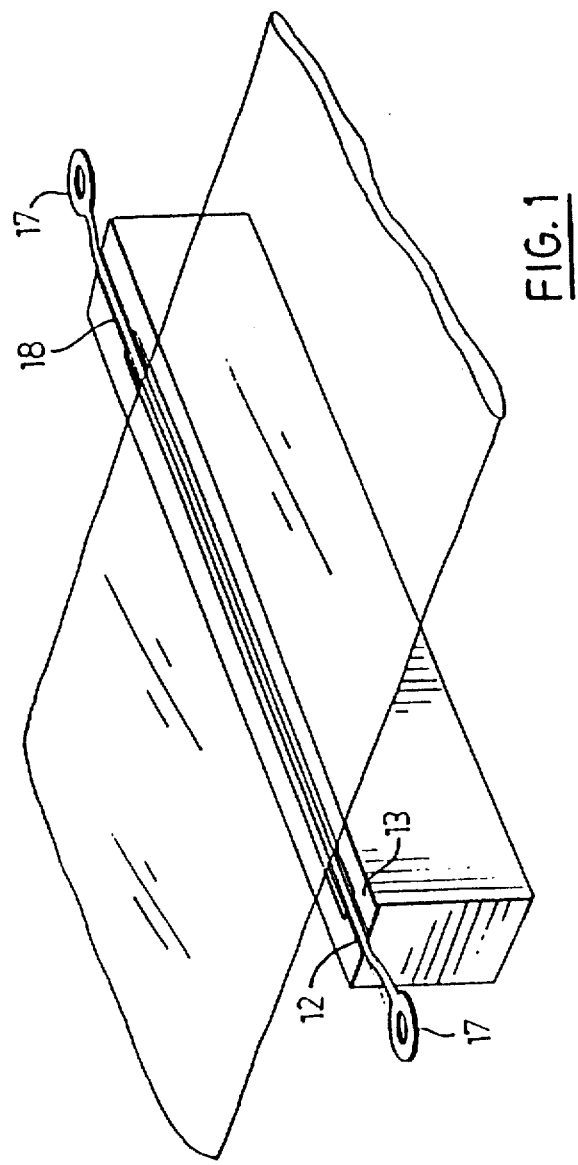
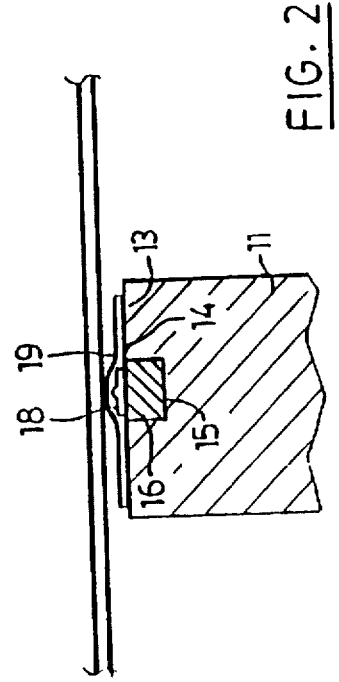

SEALING ELEMENT FOR PACKAGING MACHINES

CROSS REFERENCE TO RELATED APPLICATION

This application is a continuation-in-part of pending prior application Ser. No. 08/104,099, filed as PCT/CA92/00054, Feb. 7, 1992, abandoned and entitled Insulated Heat Sealing Jaw.

FIELD OF INVENTION

The present invention relates generally to film packaging equipment which periodically heat seal two or more films (or film edges) as the film moves through a heat seal station. More specifically, the present invention is directed to an innovative temperature profile across the heat sealing element which improves reliability and energy efficiency.

BACKGROUND OF THE INVENTION

Generally speaking, "vertical form, fill and seal" machines are well known and can be used, for example, to package milk in plastic pouches. More recently, such packaging has been used for other flowable materials, such as, mayonnaise, caramel, scrambled eggs, tomato ketchup, chocolate fudge, salad dressings, preserves and the like, particularly for the institutional user market, i.e., restaurants.

In operation, such "vertical form, fill and seal" machines will generally unroll a flat web of synthetic thermoplastic film and then form the film into a continuous tube by sealing the longitudinal edges with a lap seal or a fin seal. Generally, the tube is then moved downward to a station for filling. A sealing device below the filling station then creates an airtight heat seal across a transverse cross-section of the tube, using a pair of sealing jaws. The material (to be packaged) will generally enter the tube continuously, and therefore the film is generally sealed while material exists between the heat sealing surfaces in the tube.

After the sealing operation has been completed, the jaws are generally opened and the tube is then caused to move down a predetermined distance. Such downward movement may be influenced by the weight of the material in the tube, and/or by a drive mechanism in communication with the tube.

Once the tube moves down a predetermined distance, the heat sealing jaws collapse once again to create a second transverse seal. Almost simultaneously, the second traverse seal also severs the material-filled portion of the tube, thereby creating a sealed pouch of material. The second travsverse sealing operation also simultaneously creates the bottom seal for the next (to be formed) pouch. One such vertical form, fill and seal machine of the type described above is sold under the trade mark PREPAC.

Other conventional vertical form, fill and seal equipment cause the material (to be packaged) to enter the tube intermittently. In such cases, the material enters the tube only after the jaws have closed to form the first transverse seal. The jaws then open, and the tube is moved downward a predetermined distance. Then, before the second seal is made, the flow of material is stopped, so material will not locate between the heat sealing surfaces in the tube.

In other conventional machine designs, the sealing device does not sever the tube when making the second traverse heat seal, but rather, the tube is subsequently severed at a separate station.

With yet other machines, the heat sealing jaws move with the film as it moves down, and then releases the film at a predetermined distance. The jaws then move upward back to their original position to once again engage the film. With such machines, the jaws clamp, seal and sever the tube of film while moving in the downward direction. The jaws then open (and disengage from the film) and return to their original upward position. The downward movement of the closed jaws also serve to advance the tubular film downward.

The present invention relates to a heat sealing assembly for any of the above mentioned machines.

Conventional "impulse sealer" devices use short bursts of electrical current to create heat sealing temperatures during only a fraction of the cycle time between operations. The impulse sealer may be a round wire, e.g., a "piano" wire about 2.00 mm to 2.29 mm diameter, electrically insulated from a water-cooled supporting jaw. Alternatively, the impulse sealer can be rolled from wire stock into a flat ribbon having a longitudinal bead on the centre of one side (hereafter referred to as a "solid beaded element").

Impulse sealers having a round wire or solid beaded element are generally combined with conventional flat faced heat sealing jaws, and this design will generally be satisfactory for form and fill machines for packaging milk, water or other highly aqueous products. Other element shapes are generally more satisfactory on form, fill and seal machines when packaging thick flowable materials, such as, mayonnaise, chocolate fudge, scrambled egg mix, dressings, jams and the like. Examples of other conventional sealers are disclosed in U.S. Pat. No. 3,692,613, which issued to R. E. Pederson, U.S. Pat. No. 4,115,182, which issued to M. M. Wildmoser and U.S. Pat. No. 4,744,845, which issued to J. Posey.

Generally speaking, the heat sealing element must be electrically insulated from the metal jaw upon which it is mounted. Furthermore, the heat sealing element is also often thermally insulated from the jaw. Typically, this is accomplished by placing between the jaw and the heat sealing element, a woven glass cloth which is impregnated with polytetrafluoroethylene. The heat sealing element must be heated quickly when coming in contact with the film (to be sealed).

Generally, the jaw is wider than the flattened film, and the heat sealing element will extend beyond the edges of the jaws. The film will act as a heat sink at the "film contact" portion of the heat sealing element, and therefore, the heat sealing element tends to be hotter at the ends of the jaw, where the film does not come in contact with the heat sealing element.

As a result, the woven glass fibre cloth is continually subjected to high heat at the end portions of the heat seal element, where there is no film to drain the heat away. Thus the polytetrafluoroethylene often becomes heat degraded (i.e., burnt), and it is often necessary to replace the woven glass fibre cloth at frequent intervals. Previous attempts to alleviate this problem have not been entirely successful, and the present invention seeks to address this problem.

SUMMARY OF THE INVENTION

The present invention is directed to an improved temperature profile along a heat sealing element which is particularly useful when incorporated into a form, fill and seal packaging machine. In the preferred embodiment, the end portions of the sealing element (which do not seal the packaging film) are specifically designed to have a maximum temperature, on average, which is no greater than about 25° C. above the temperature of the remaining portion of the sealing element which seals the packaging film. More preferably, the maximum temperature of the sealing element's end portions are no greater than 10° C. above the remaining portion of the sealing element (which seal the packaging film).

In the most preferred embodiment, the (sealing element) end portions have a temperature which is about the same as the film sealing portion of the heat seal element, and this temperature is preferably an optimal temperature for heat sealing the particular film being used. The minimum temperature of the sealing element's end portion is preferably about 50° C. less than the film sealing portion of the heat seal element. Yet more preferably, the minimum temperature of the sealing element's end portion is about 25° C. less than the film sealing portion of the heat sealing element, and yet more preferably, the minimum temperature of the sealing element's end portion is about 10° C. less than the film sealing portion of the heat sealing element.

In conventional equipment, the end portions of the sealing element are generally at a dramatically greater temperature than the temperature of the portion of the sealing element which contacts and seals the packaging film. By modifying the sealing element temperature profile, it was surprisingly discovered that the reliability, durability and energy efficiency of the sealing element can be dramatically improved. In the most preferred embodiment, the modified temperature profile is accomplished by providing greater thermal insulation along the film sealing portion of the heat sealing element and less (or no) thermal insulation along the remaining ends of the heat sealing element.

The preferred assembly has a first and a second jaw. The first jaw supports an electrical impulse heat sealing element. Preferably, the ends of the heat sealing element are connected to electrical terminals which secure the heat sealing element in proper alignment relative to this first jaw. The terminals also provide the heat sealing element with electrical current when needed, during the heat sealing operation. Preferably, at least one of the jaws is capable of transverse motion and is adapted to collapse a tubular, thermoplastic film as it passes between the jaws.

Thermal insulation is placed between the first jaw and the sealing element to inhibit heat transfer from the heating element to the jaw. Insulating material is also applied over the heat sealing element to inhibit sticking between the heat sealing element and the tubular film. Critical to the preferred embodiment of the present invention is that the thermal insulation applied along the middle portion of the heat seal element (the portion of the heat seal element which will seal the packaging film) provides greater thermal insulation than the thermal insulation applied at the ends of the sealing element (the portion of the heat sealing element which extends beyond the film edges and therefore will not contribute to sealing the packaging film).

In this way, the middle portion will be more highly insulated (thermally) than the end portions. However, the middle portion is also subjected to cooling, because as the middle portion (of the heat sealing element) heat seals the film, heat transfers to the film and the middle portion is cooled. The non-sealing end portions (of the sealing element) however do not directly transfer heat to the film. Hence, the added insulation along the middle portion will tend to increase the temperature of the middle portion (relative to the end portions), and the heat sealing of the film will tend to lower the temperature of the middle portion (relative to the end portions).

The temperature profile is therefore dependant upon the thermal insulation along the heat sealing element and the rate of heat sealing. Ideally, the temperature at the end portions are not so high as to cause degradation of the insulation material (which also lowers energy efficiency) and not so low as to risk heat seal leaks at the edges of the sealed film. Ideally, the middle portion of the heat seal element is within the appropriate temperature range tier the film being sealed. Ideally, the temperature along the entire length of the heat seal element is substantially constant and optimized for the film being sealed. Ordinary skill and experimentation may be necessary in choosing the optimal degree of insulation along the middle portion and the end portions of the heat sealing element for any particular film and/or for any particular heat sealing rate.

In one embodiment, the thermally insulating material has a width of at least 2.0 mm and a thickness of at least 1 mm. In another embodiment the thermally insulating material has a width of up to about 100 mm wider than the heat sealing element.

In a further embodiment the thermally insulating material is made from a glass fibre-filled epoxy insulating material having a thermal conductance of less than about 500 W/(m2.K).

In yet another embodiment, the thermally insulating material is made from a glass fibre-filled epoxy insulating material having a coefficient of thermal conductivity of from 0.22 W/(m.K) to 2.2 W/(m.K) and a width of from 2 to 22 mm and a thickness of from 4 to 10 mm.

In a further embodiment the thermally insulated film or tape is a woven glass fibre tape coated or impregnated with a polytetrafluoroethylene.

In another embodiment the thermally insulated film is a polyimide film.

The requirements for the thermally insulating material will be understood by those skilled in the art as being a good thermal insulator with sufficient mechanical strength for the repetitions of the heat sealing operation. Such operation may have intermittent temperatures of up to 300° C., and at least a year's operation at this level would be commercially desirable. The material preferably should have good compressive strength and should be sufficiently hard, but not brittle, to withstand the constant hammering of the closing jaws. The material should also be dimensionally stable so that there is little creep or shrinkage of the material.

BRIEF DESCRIPTION OF THE DRAWINGS

FIG. 1 is a perspective view of a preferred embodiment of the present invention in combination with a packaging film.

FIG. 2 is a simplified cross-sectional view of an alternative embodiment of the present invention.

DETAILED DESCRIPTION OF THE PREFERRED EMBODIMENTS AND BEST MODE

An embodiment of the invention is illustrated in the accompanying drawings. FIG. 1 shows a three quarter view of a preferred embodiment of the present invention, and FIG. 2 shows a simplified cross-section of a jaw with the thermal insulating material therein.

The drawings show first heat sealing jaw 11 upon which is mounted a heat sealing element 12. The heat sealing assembly also has cooperating second heat sealing jaw (not shown). Both jaws are mounted on a form and fill machine (not shown) as is known in the art. Both jaws may move reciprocally towards and away from each other. Heat sealing jaw 11 is usually made of a thermally conductive material such as aluminium and is water cooled.

Along the full length of face 13 of the first jaw is placed a woven glass fibre cloth 14 (not shown in FIG. 1, for clarity), impregnated with a polytetrafluoroethylene. Along the length of jaw 11 there is a channel 15, in which is placed an thermally insulating material 16, e.g. bar made from a glass fibre-filled epoxy resin. Heat sealing element 12 comprises connector pieces 17 and ribbon 18.

In the embodiment shown, ribbon 18 is a formed from wire stock rolled into a flat ribbon with a longitudinal centre bead on the side distal to jaw 11. Connector pieces 17 have holes therein for attaching to electrical terminals (not shown). The heat sealing element is typically made from a nickel-chromium alloy.

A further layer of woven glass fibre cloth impregnated with polytetrafluoroethylene 19 (not shown in FIG. 1 ) is placed over ribbon 18. This woven cloth acts primarily to prevent sticking and burning of the thermoplastic film which, but for the cloth, would come into contact with the sealing element 12. It is also possible to use polyimide film in lieu of the cloth 19. The second jaw (not shown) has a silicone rubber backing strip upon which the heat sealing element 12 may press in order to sever and seal the thermoplastic film therebetween.

With prior art heat sealing assemblies, it has been found that under normal operating conditions for packaging milk and the like, e.g. at operating speed of up to about 45 pouches per minute, the woven glass fibre cloth impregnated with polytetrafluoroethylene is able to withstand the temperatures required to make the heat seals. However, as the speed of the machine is increased, e.g. to about 60 pouches per minute, there has been a tendency to increase the temperature of the heat sealing element in order to seal and sever the thermoplastic film.

By increasing the temperature of the heat sealing element, the portions which are not in contact with the film, sometimes referred to as the outboard ends of the heat sealing element, the element temperatures are even higher because there is not the thermal load from melting the film. These higher temperatures cause early deterioration of the woven glass fibre cloth impregnated with polytetrafluoroethylene and heat aging of the silicone rubber which shows up as grooves worn into the rubber where the element makes contact. In the case of polyethylene film, the excessive temperature also causes the polyethylene of the pouch film to burn at the corners of the pouch. Eventually a condition is reached where, if the filler operator fails to change the woven glass fibre cloth and the silicone rubber, pouches are produced with "corner leaks".

It has been found that by placing the thermally insulating strip 16 in jaw 11 only under the position where the thermoplastic film passes, the energy required to make the heat seal can be reduced by about 40%. This results in substantially lower heat sealing element temperatures under the film because heat from the element is directed towards the film rather than being drawn towards the jaw acting as a heat sink. At the outboard ends of the sealing element, the woven glass fibre cloth under s heat sealing element 12 provides only limited thermal insulation from the jaw (acting as a heat sink) and the heat there is drawn towards the jaw, thus keeping the ends cool. As will be understood by those skilled in the art, it is undesirable that outboard ends of the sealing element to be too cold, otherwise the film will not seal at the edges. In practice, the insulating strip 16 need only to be as long as the film is wide, or slightly wider to accommodate situations when the film does not always land exactly centred over the thermally insulating strip, as the jaws close.

Physical dimensions of the thermally insulating material are somewhat dictated by the physical constraints of the jaw. The thickness and thermal resistance of the material must be such that there is an adequate thermal barrier. For example, a 6 mm thick thermal insert for a jaw, which had a conductance of 227 W/(m2.K) proved adequate. An insert having a conductance of 47.7 W/(m2.K) was even better. The jaw was made of aluminium having a conductance of about 11 350 W/(m2.K) and there was about 13 mm of metal beneath the channel in which the thermal insert was placed.

The invention is further illustrated by reference to the following examples:

EXAMPLES

Example 1

In a first experiment, a prior art heat sealing assembly was taken and 250 ml of cold water were sealed in a 12.7 cm wide by 11.1 cm long pouch made of 75 μm thick low density polyethylene film at the rate of 60 pouches per minute. The jaw was made of aluminium and was water cooled. Two layers of woven glass fibre cloth impregnated with polytetrafluoroethylene were place between the heat sealing element and associated jaw. A further layer of woven glass fibre cloth impregnated with polytetrafluoroethylene was placed over the heat sealing element.

Temperatures along the heat sealing element temperature were measured with very thin, fast response thermocouples. It was found that the heat sealing element reached a maximum temperature under the pouch of 325° C. and 360° C. at the outboard ends. This is well above the intermittent maximum temperature rating of 288° C. for the polytetrafluoroethylene. Approximately 150 joules of electrical energy were used to make an acceptable heat seal. In continuous operation, it was found that after about one hour, the woven cloth over the sealing element was worn and burned unacceptably at the outboard ends of the heat sealing element.

In a second experiment, an insulating strip 12.7 cm long by 6.35 mm deep by 22 mm wide was inserted into a channel cut into the jaw, thus thermally insulating the heat sealing element from the jaw in the area under the pouch only. The insulating strip was a high temperature epoxy which had a temperature rating of 400° C. and a thermal conductance of 277 W/(m2.K) (coefficient of thermal conductivity of 1.44 W/(m.K)). One layer of woven glass fibre cloth impregnated with polytetrafluoroethylene was placed between the heat sealing element and the jaw. All other conditions were kept the same as in the first experiment.

It was found that the heat sealing element temperature reached a maximum of 320° C. under the pouch. At the outboard ends beside the pouch, the maximum temperature was only 230° C. Furthermore, only about 88 joules of electrical energy were required to make a satisfactory seal, an energy reduction of 40%. However, if the pouch film drifted a little sideways, it was found that the pouches did not separate cleanly in the corner which was adjacent the colder outboard end. More energy, i.e. 106 joules was required to get the pouches to separate cleanly and the temperature of the element now reached 360° C. under the pouch and 265° C. at the outboard end. Clearly one layer of woven glass fibre cloth impregnated with polytetrafluoroethylene under the heat sealing element resulted in too low a temperature at the outboard ends. However, with this setup, it was demonstrated that the woven glass fibre cloth impregnated with polytetrafluoroethylene over the element lasted more than five times longer than in the first experiment.

In a third experiment an insulating strip 13.335 cm long by 6.35 mm deep by 22 mm wide was inserted into the channel cut into the heat sealing bar. The strip was a glass fibre-filled high temperature epoxy insulating sheet having a thermal conductance of 48 W/(m2.K) (coefficient of thermal conductivity of 0.30 W/(m.K)). This time two layers of woven glass fibre cloth impregnated with polytetrafluoroethylene were used under the heat sealing element. All other conditions were kept the same as in the other two experiments.

It was now found that the heat sealing element temperature reached a maximum of 290° C. both under the pouch and beside the pouch at the outboard ends. Only about 85 joules of electrical energy were required to make a satisfactory seal. Additionally, whenever the pouch drifted sideways, it continued to separate cleanly, even in situations when the film of the pouch drifted marginally off the insulating strip, without the necessity for additional electrical energy input to the heat sealing element.

All woven cloth used in these examples was 190 μm thick (including the adhesive) by 190 mm wide. The jaw in which the thermal inserts were placed was made of aluminium which had a thermal conductivity of 154 W/(m.K) or a conductance of about 12 000 W/(m2.K) between the surface of the jaw and the cooling channel in the jaw.

What is claimed is:

1. An assembly for heat sealing a film, comprising a jaw and an electrical impulse heat sealing element mounted on the jaw, the impulse heat sealing element comprising an end portion and a middle portion, wherein only the middle portion directly heat seals the thermoplastic film, and the end portion acts as a conduit to provide energy to the middle portion for purposes of heat sealing the film, the improvement comprising:

a middle insulating material and an end portion insulating material, the middle insulating material and the end portion insulating material both being located between the jaw and the heat sealing element, the middle insulating material providing thermal insulation to the middle portion of the heat sealing element, and the end portion insulating material providing thermal insulation to the end portion of the heat sealing element, wherein the resulting thermal insulation of the middle portion is greater than the thermal insulation of the end portion.

2. An assembly in accordance with claim 1 wherein the middle insulating material comprises glass fiber-filled epoxy and the end portion insulating material is a woven glass-fiber cloth.

3. An assembly in accordance with claim 1, wherein during operation of the assembly, the temperature of the end portion of the heat sealing element is no greater than 50 degrees Centrigrade higher than the temperature of the middle portion of the heat sealing element.

4. An assembly in accordance with claim 1, wherein during operation of the assembly, the temperature of the end portion of the heat sealing element is no greater than 25 degrees Centrigrade higher than the middle portion of the heat sealing element.

5. An assembly in accordance with claim 1, wherein during operation of the assembly, the temperature of the end portion of the heat sealing element is no less than 50 degrees Centrigrade below the temperature of the middle portion of the heat sealing element.

6. An assembly in accordance with claim 4, wherein during operation, the temperature of the middle portion and the temperature of the end portion of the heat sealing element is equal to or greater than the minimum heat sealing temperature for the film.

7. An assembly in accordance with claim 1, wherein the temperature of the sealing element's end portions is: a) no greater than 10 ° C. above the middle portion of the sealing element; and b) no less than 25° C. below the middle portion of the sealing element.

8. An assembly in accordance with claim 7, wherein the middle insulating material has a width of at least about 2 mm and a thickness of at least about 1 min.

9. An assembly in accordance with claim 7, wherein the middle insulating material has a width of up to about 100 mm wider than the heat sealing element.

10. An assembly in accordance with claim 7, wherein the middle insulating material is made from a glass fibre-filled epoxy insulating material having a thermal conductance of less than about 500 W/(m$^2$.K).

\* \* \* \* \*

UNITED STATES PATENT AND TRADEMARK OFFICE
CERTIFICATE OF CORRECTION

PATENT NO. : 5,538,590
DATED : July 23, 1996
INVENTOR(S) : David C. Riley

It is certified that error appears in the above-identified patent and that said Letters Patent is hereby corrected as shown below:

Column 8, line 40, claim 8 - change "min." to --mm.--.

Signed and Sealed this

Seventh Day of January, 1997

Attest:

BRUCE LEHMAN

Attesting Officer

Commissioner of Patents and Trademarks